June 15, 1965 C. A. BLAKESLEE 3,189,910
MULTIPLE-POINT MEASURING INSTRUMENT
Filed July 13, 1961 4 Sheets-Sheet 2

June 15, 1965    C. A. BLAKESLEE    3,189,910
MULTIPLE-POINT MEASURING INSTRUMENT
Filed July 13, 1961    4 Sheets-Sheet 4

3,189,910
MULTIPLE-POINT MEASURING INSTRUMENT
Clinton Alfred Blakeslee, Middlebury, Conn., assignor to
 The Bristol Company, Waterbury, Conn., a corporation
 of Connecticut
Filed July 13, 1961, Ser. No. 123,901
18 Claims. (Cl. 346—32)

This invention relates to measuring instruments and more particularly to instruments wherein measurements are selectively performed on the magnitudes of a plurality of conditions.

There has been developed a multiple-point measuring instrument which is highly accurate and extremely efficient in operation. One such instrument is disclosed, for example, in Patent 2,628,149, issued February 10, 1953, to C. A. Blakeslee. Instruments of this class include self-balancing potentiometers, bridges or other instruments for measuring the magnitudes of a series of conditions and for recording these magnitudes on a common scale, as for example, by recording them with distinctive markings, and to suitable coordinates, on a paper chart.

In the use of such measuring and recording instruments there must necessarily elapse an interval of time between the instant one record is made and that when the succeeding record is made. During this interval, the measuring or balancing mechanism is engaged in positioning the recording element at the proper location with respect to the chart. Also during this interval, a switching mechanism is actuated to transfer the measuring circuit from one to another of several sensitive elements respectively associated with the magnitudes to be determined, and at the same time to shift the marking element of the recording mechanism to a new and distinctive signal corresponding to the individual magnitude under measurement.

In many measuring and recording instruments of this class, it is customary for the switching and recording mechanisms to be shifted periodically at uniform intervals of time, the time intervals being of sufficient duration so as to allow the balancing mechanism to attain a condition of complete balance, corresponding to a true measurement of the instantaneous value of the magnitude being measured, before the printing or recording operation takes place. Other instruments of this class, such as those of the type disclosed by the above-mentioned Blakeslee patent, for example, provide means for actuating the printing and switching mechanisms immediately upon attainment of a condition of balance. While the present invention is of general applicability, it is particularly useful in connection with either of these types of instruments.

Heretofore, measuring and recording instruments of the foregoing class have proved deficient in several respects. In the manufacture of such instruments, for example, it is commercially desirable to provide for a maximum number of points of measurement, whence the user may connect the instrument so as to determine the actual conditions to be measured. In previous instruments of this class, the total cycle of measurement operations frequently required a period of time which was determined by the total number of measuring points. However, in cases in which a particular instrument was connected so as to measure a lesser number of conditions, there were periods of time in which the measuring and recording functions of the instrument were inactive. While attempts heretofore have been made to remedy these defects, such attempts often have involved inconvenient and expensive mechanical or electrical alterations or have otherwise proved inadequate.

One general object of this invention, therefore, is to provide a new and improved instrument for selectively measuring the magnitudes of a plurality of conditions.

More specifically, it is an object of this invention to provide a measuring instrument of the character indicated in which selected measuring operations are programmed in a rapid and straightforward manner.

Another object of this invention is to provide such a measuring instrument, adaptable to any number of points up to a predetermined maximum number, in which the operation of the selecting or switching mechanism is sequential through the cycle of active points, and continuous and at maximum speed through the cycle of any inactive points.

Still another object of this invention is to provide a measuring instrument utilizing comparatively simple mechanical and electrical components, which instrument is economical to manufacture and thoroughly reliable in operation.

In one illustrative embodiment of this invention, there is provided a multiple-point measuring and recording instrument which includes a plurality of elements at least some of which are respectively associated with sources of magnitudes to be measured. A balanceable measuring network is successively connected to selected elements by switching means driven under the control of an electric motor. Upon the completion of each such connection, this network is balanced, and the magnitude associated with the selected element is recorded on a common record medium.

In accordance with one feature of the invention, there is provided unique sequencing means operatively associated with the switching means which is arranged to enable the selection thereby, from the maximum number of elements provided, of predetermined ones of these elements associated with the magnitudes selected for measurement.

In accordance with another feature of the invention, in certain particularly advantageous embodiments, the operation of the switching means is momentarily arrested for each of the elements selected, to enable the balancing of the measuring network, but for the non-selected elements the switching means is operated continuously and at maximum speed. The arrangement is such that the measuring network is balanced only for the magnitudes associated with the selected elements. As a result, the amount of time required for each complete cycle of the switching means is greatly reduced.

In accordance with a further feature of the invention, in certain good embodiments, the switching means is connected to its drive motor through an electromagnetic clutch. This clutch not only serves to control the operation of the switching means but also and simultaneously controls the marking element of the recording mechanism to select a distinctive signal corresponding to each selected magnitude under measurement. With this arrangement, the overall time required for each measuring cycle is further reduced.

In accordance with still another feature of the invention, in some embodiments, the energization and deenergization of the clutch is effected by a switch of unique construction and arrangement. This switch is at times controlled by the sequencing means and at other times by a timing mechanism. Thus, at particular points in the operation cycle, the switch is actuated by the timing mechanism to energize the clutch, thereby driving both the switching means and the associated sequencing means. At other, predetermined points in the cycle, the switch is actuated by the sequencing means to deenergize the clutch and arrest operation of the switching means, thus permitting measurement of the selected magnitudes.

The present invention as well as further objects and features thereof will be understood more clearly and fully from the following detailed description of a preferred embodiment thereof, when read in conjunction with the accompanying drawings, in which.

Figure 1:
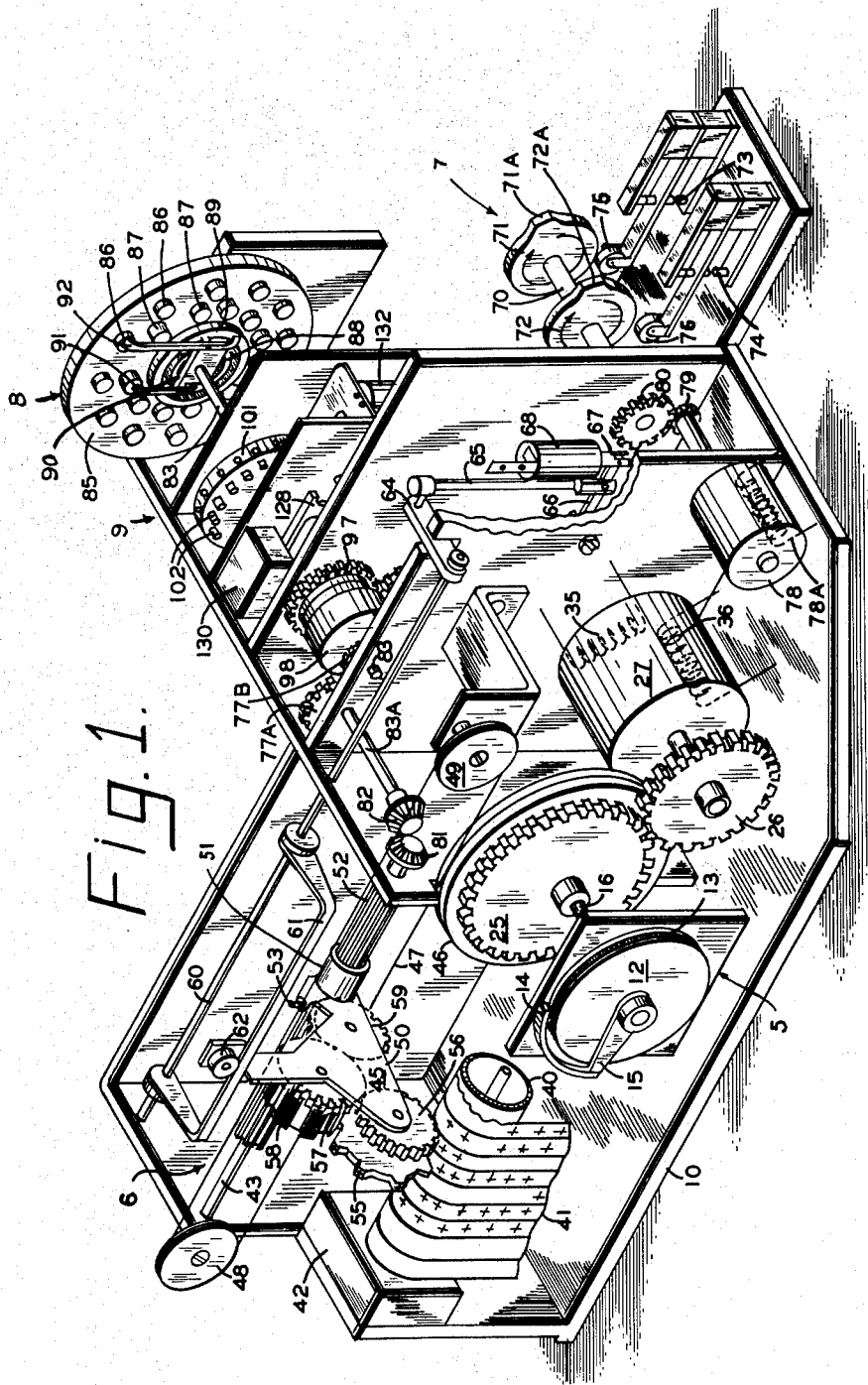
FIGURE 1 is an isometric, partially diagrammatic representation of a multiple-point recording potentiometer adapted to the purpose of thermocouple pyrometry and embodying the principles of the present invention.

Referring initially to FIGURE 1 of the drawings, there is shown a multiple-point recording potentiometer which includes a balanceable measuring network 5 and a recording mechanism 6 for measuring and recording the magnitudes of a series of selected temperatures or other conditions. The apparatus operates under the general control of a timing mechanism 7 and is successively connected by a switching mechanism 8 to particular sensitive elements associated with the magnitudes to be measured. The selection of these sensitive elements is controlled by means of a sequencing mechanism 9. The several components of the apparatus are mounted, as by journalling or other suitable mounting methods, on a base member indicated generally at 10.

In order to facilitate the description of the embodiment of the invention illustrated in the drawings, there will first be given a brief discussion of the measuring system 5, the recording system 6, the timing mechanism 7 and the switching mechanism 8 of this embodiment. That is, before describing the novel sequencing mechanism for predetermining the particular magnitudes to be measured, a description will be given of the various mechanisms for measuring and recording these magnitudes.

The measuring system

The measuring system 5 includes a disk 12 having an extended slide-wire 13 uniformly distributed about the periphery thereof. A slidable contact member 14 electrically engages the slide-wire 13 and is carried by an arm 15 mounted on a shaft 16. This shaft is journalled in a portion of the base 10 concentrically with the disk 12 and is adapted for rotation about the axis thereof, whereby the contact member 14 may be freely positioned at any point along the extended length of the slide-wire 13. The slide-wire 13 is energized from a battery or equivalent source of electromotive force 17 (FIGURE 2) through an adjustable resistor 18, whereby the current through the slide-wire, and hence the potential gradient therealong, may be adjusted to, and maintained at, a predetermined value. Thus, according to the well-known principles of the potentiometer, the electromotive force between the contact member 14 and a selected extremity of the slide-wire, or between conductors 21 and 22 connected respectively thereto, is proportional to the displacement of the contactor from said selected extremity, or to the angular displacement of the shaft 16 from a reference position. Conductor 21 is connected to one of the input terminals of a detecting and amplifying unit presently to be described, and conductor 22 to one side of a source of electromotive force to be measured, the measuring circuit being completed by a conductor 23 connected between the free terminal of said amplifier input and the free terminal of said source to be measured.

The system is balanced by controlling the angular position of the shaft 16 in accordance with the magnitudes of the electrical potentials to be measured. This control may be effected by any one of a number of methods well known in the art. For example, in the illustrated arrangement, the shaft 16 is affixed to a gear member 25 (FIGURE 1), meshing with a suitable pinion 26 on the shaft of a reversible balancing motor 27, whereby to be rotated in response to operation of the motor 27 in either direction. Operation of the motor is rendered responsive to unbalance existing between the potential across the portion of the slide-wire 13 corresponding to the displacement of the contact member 15 and that across the terminals of a source to be measured, either by means of a galvanometer-relay system, as fully set forth and described in U.S. Letters Patent No. 2,320,066, granted May 5, 1943, to F. B. Bristol, or by means devoid of moving parts in the detector element, as for example by the induction modulator device described in U.S. Letters Patent No. 2,444,726, granted July 6, 1948, to William H. Bussey.

Figure 2:
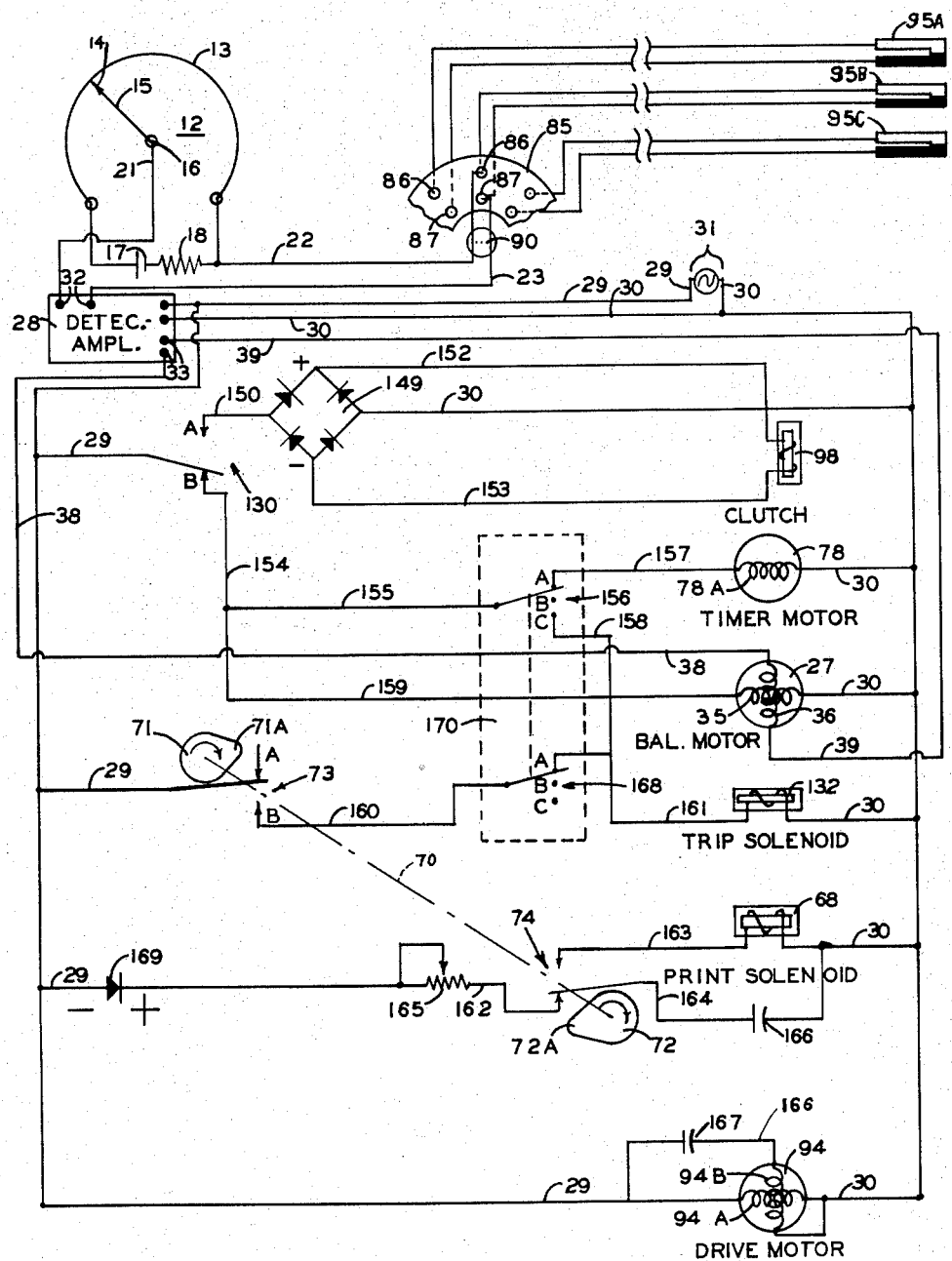
FIGURE 2 is an electrical circuit diagram for the apparatus of FIGURE 1.

Referring to FIGURE 2, and assuming the system set forth in said Bussey patent, a combined detector-amplifier element 28 is energized through conductors 29 and 30 by an alternating-current source 31 of fixed "power" frequency. The detector-amplifier is provided with input terminals 32 and output terminals 33. The input terminals 32 are connected to the movable contact member 14 and to one side of the source of electromotive force to be measured by conductors 21 and 23, respectively, as hereinbefore set forth, while the output terminals 33 are connected to the balancing motor 27, as will now be described.

The motor 27 is preferably of the two-phase class, having two windings 35 and 36 geometrically displaced from one another. These windings are adapted to be energized from alternating electromotive forces of common frequency but different in phase, to produce in the magnetic system of said motor a rotating field and thereby cause the motor shaft to be rotated in a direction depending upon the sense of phase displacement between said alternating electromotive forces.

The winding 35 is connected to the conductors 29 and 30, and thereby to the alternating voltage source 31, through an intermediate switching circuit whose function will be further explained hereinafter. The winding 36 is connected by means of two conductors 38 and 39 to the output terminals 33 of the detector-amplifier 28.

Operation of the measuring and balancing system is as follows: By the principles of the detector-amplifier system, as set forth in said Bussey patent, there appears at the output terminals 33 an alternating electromotive force having the frequency of the source 31 and bearing a phase relationship thereto depending upon the polarity of the unidirectional potential impressed upon the input terminals 32. The amplitude of this alternating electromotive force is dependent upon the magnitude of said potential. The current in the motor winding 36, connected to the output terminals 33, therefore varies in intensity and phase-position with the magnitude and polarity of the potential appearing between the conductors 21 and 23 connected to the input terminal. Upon the energization of the motor winding 35, the velocity and direction of rotation of the motor 27 are correspondingly controlled in accordance with these variations.

It is recognized that in certain types of detector-amplifier system applicable to servomotor operation the potential applied to the control winding 36 of the motor 27 may at no time attain a zero value. Under such conditions, however, the residual potential will pass through a value wherein it contains no component adapted to cooperate with the normal excitation of the motor to produce rotation, whereby, insofar as concerns motor operation, the control winding may be considered as being deenergized.

The potential appearing between the conductors 21 and 23 represents the algebraic sum (or when the two sources are connected in opposition, the difference) of the electromotive force between the conductors 22 and 23 and that derived from the portion of the slide-wire 13 between the contact 14 and the extremity to which the conductor 22 is connected. It follows that, by a suitable selection of mechanical and electrical interconnections, the motor 27 may be caused to rotate the shaft 16 in a sense to move the contact 14 toward a position where such difference is of a zero value. In other words, a balancing action is obtained, wherein the shaft 16 and elements carried thereby continually tend to assume an angular position representative of the magnitude of the voltage appearing between the conductors 22 and 23.

The recording system

Referring again to FIGURE 1, a chart-drum 40 is supported from the base 10 and carries a paper strip chart 41 which has inscribed thereon suitable indicia graphically representing the values of one or more magnitudes to be measured. The drum 40 is adapted to be driven at a constant speed by means of a clock or equivalent time element 42. An elongated shaft 43 is journalled in the base 10 with its axis parallel to that of the drum 40. Slidably mounted on the shaft 43 is a printing mechanism 45, presently to be described, which is adapted to imprint suitable indicia upon the surface of the chart.

Mounted on the balancing mechanism shaft 16 and rotatable therewith is a disc 46 having wrapped about its periphery a flexible cord or cable 47 which passes around two grooved pulleys 48 and 49 positioned near the respective extremities of the shaft 43. A portion of this cable passes near the printing mechanism 45 and is attached thereto to provide means for translating the printing mechanism to linear positions with respect to the chart 41, corresponding to angular positions assumed by the shaft 16.

The printing mechanism 45 includes a supporting plate member 50 having a sleeve portion 51 adapted to slide longitudinally upon an enlarged part of the shaft 43. The enlarged part of the shaft 43 takes the form of an extended pinion 52 upon which the sleeve 51 has a slidable and rotatable fit. The supporting plate 50 carries a screw or other clamping means 53 to which may be secured the cable 47 for the purpose of translating the printing mechanism along the shaft 43. Rotatably mounted upon the plate 50 is a printing wheel 55 carrying suitable indicia for marking upon the chart 41. A gear member 56 is attached to the printing wheel and is in meshing engagement with a similar gear member 57, also rotatably mounted on the plate 50. This latter gear member carries one or more ink pads 58 adapted to be brought into contact with the indicia upon the printing wheel, thus charging the indicia thereon with ink of a suitable color. It will be understood that if the indicia are made of different identifying shapes the ink pads may all be of one color; and as an alternative, the indicia may all be of a common design, with the individual pads carrying inks of distinctive colors. An idler gear 59 is rotatably mounted upon the plate 50 and meshes with the gear 57 and with the extended pinion 52, whereby, when the pinion is rotated, suitable rotary motion will be imparted to the printing wheel 55 and to said associated ink pads 58.

Journalled in the base member 10, with its axis parallel to that of the shaft 43 and horizontally displaced therefrom, is an elongated shaft 60. The shaft 60 is adapted for angular displacement through a small angle about its axis and carries on a cantilever support an extended bar 61 which is juxtaposed to, and parallel to, the shaft 43. Carried by the mounting plate 50 is a roller or equivalent member 62 resting upon the bar 61, and subject to displacement thereby, so that, with downward or upward movement of the bar 61, the printing mechanism 50 may be displaced through a small angle to bring the indicia on the printing wheel 55 into, or out of, marking engagement with the surface of the chart 41.

Angular movement of the shaft 60 is effected by means of a linkage system which includes three lever arms 64, 65 and 66. The arm 64 is rigidly secured at one end to the shaft 60 and is pivotally affixed at its other end to one end of the arm 65. The arm 65 is pivotally connected at its free end to one end of the arm 66, and this latter arm it attached intermediate its ends to the operating plunger 67 of a solenoid 68. Upon the energization of this solenoid, in a manner which will become more fully apparent hereafter, the plunger 67, the arm 66 and the arm 65 are moved upwardly, as viewed in FIGURE 1, thereby pivoting the arm 64 to rotate shaft 60 through a small angle and actuate the printing mechanism in the manner described above.

The timing mechanism

The timing mechanism 7 includes a timing shaft 70 which is journalled within a portion of the base 10 and is disposed with its axis extending in a direction parallel to that of the balancing mechanism shaft 16. The shaft 70 is provided with two cams 71 and 72 which are rigidly affixed thereto in spaced relationship with each other. These cams are substantially circular but are formed with respective raised portions 71A and 72A which each occupy a small part of the cam periphery.

The cams 71 and 72 respectively control the operation of two transfer switches 73 and 74 which are insulatedly supported on the base 10. The movable arms of these switches are provided with corresponding cam followers 75 and 76 which respectively engage the camming surfaces of the cams 71 and 72.

The shaft 70 is continuously rotated at a constant speed in a clockwise direction, as viewed in FIGURE 1, by a timer motor 78 which is connected thereto through speed ratio establishing gears 79 and 80. The timer motor is of the self-synchronous type and includes a single winding 78A. The raised portion 72A of the cam 72 on shaft 70 is angularly spaced in the direction of rotation from the raised portion 71A of the cam 71 so that, for each revolution of the shaft, the transfer switch 74 is operated prior to the transfer switch 73, for purposes that will become more fully apparent hereafter.

The switching mechanism

Rotatably supported on a portion of the base 10 is an elongated shaft 83. The shaft 83 extends in a direction parallel to the balancing mechanism shaft 16 and the timing shaft 70 and perpendicular to the recording mechanism shaft 43. A stub shaft 83A is disposed adjacent one end of the shaft 83 and is connected thereto by meshing gears 77A and 77B. The shaft 83A is connected in driving relationship with the shaft 43 through two bevel gears 81 and 82.

Figure 3:
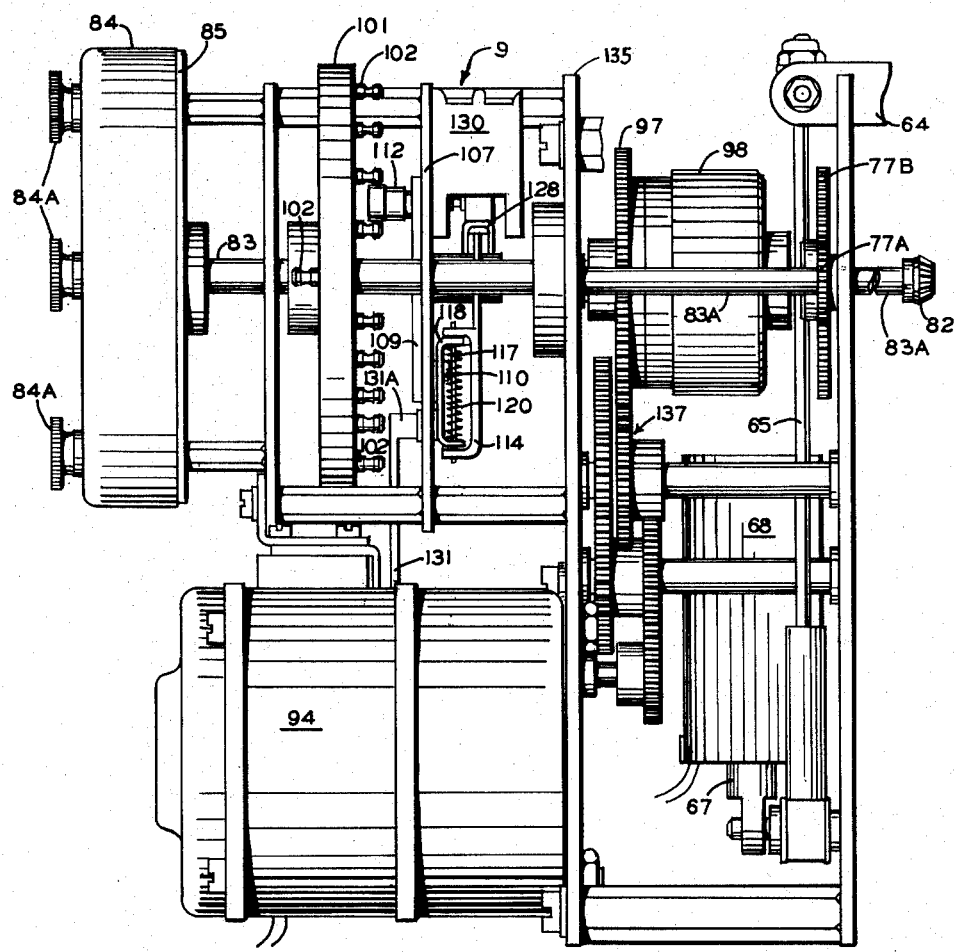
FIGURE 3 is a rear elevation view of the sequencing portion of FIGURE 1, together with associated parts.

As best shown in FIGURE 3, a housing 84 is disposed adjacent the opposite end of the shaft 83. (In FIGURE 1, the apparatus has been illustrated with this housing removed, for purposes of clarity.) The housing 84 partially encloses a stationary terminal plate 85 and is suitably affixed thereto, as by thumb screws 84A. The plate 85 is supported by a portion of the base 10 and is provided with two sets of insulated contacts 86 and 87 which are respectively spaced about circles having a common center lying upon the axis of the shaft 83. Concentric with these circles are two contact rings 88 and 89 which also are insulatedly supported on the plate 85. An insulating block 90 is affixed to the adjacent end of the shaft 83 and carries two contact arms 91 and 92 in spaced, parallel relationship with each other. One end of the contact arm 91 is in engagement with the inner contact ring 88, while the other end thereof is in position to engage successive ones of the contacts 87. In a similar manner, one end of the contact arm 92 engages the outer contact ring 89, and its other end is adapted to engage successive ones of the contacts 86.

The contact rings 88 and 89 are respectively connected to the conductors 22 and 23 (FIGURE 2), between which the apparatus is adapted to measure and record the electrical potential. The arrangement is such that, upon rotation of the shaft 83, individual contacts 86 in the outer contact circle and corresponding contacts 87 in the inner circle are simultaneously connected by the contact arms 91 and 92 to the respective rings 89 and 88 and thereby to the conductors 23 and 22. The apparatus being shown in its adaptation to the measurement of temperatures, selected pairs of contacts are connected to the terminals of a corresponding thermocouple, such as the thermocouples 95A, 95B and 95C. With the apparatus in the position shown schematically in FIGURE 2, the orientation of the contact arms is such as to connect the thermocouple 95B across the conductors 22 and 23, to thereby enable the measurement and recording of the temperature of this thermocouple.

Rotation of the shaft 83 is effected by means of a drive motor 94 (FIGURE 3) which is of the condenser type and is mounted beneath the shaft 83 on a sub-frame 135 extending upwardly from the base 10. The motor 94 is connected to the shaft through a gear train indicated generally at 137, a drive gear 97 and an electromagnetic clutch 98. The drive gear 97 is rotatably mounted on the shaft 83 and is arranged to drive this shaft intermittently through the clutch 98. This clutch is of conventional construction and illustratively may be of the type manufactured by the Warner Electric Brake and Clutch Company, of Beloit, Wisconsin, and designated as catalog type SF, "Clutch Coupling."

As best shown in FIGURE 2, the drive motor 94 includes two windings 94A and 94B which are angularly displaced from one another and are energized in a manner such that their magnetic effects are out of phase. A rotating field is thereby produced to cause the motor shaft and the attached gear train to rotate in a direction dependent upon the phase relation of the currents in the windings. The winding 94A is connected across the conductors 29 and 30, and thereby across the alternating current source 31. One terminal of the winding 94B is connected to the conductor 30, and its other terminal leads through a conductor 166 and a condenser 167 to the conductor 29, thus effecting the desired phase displacement between the current therein with that in the winding 94A.

*The sequencing mechanism*

Figure 5:
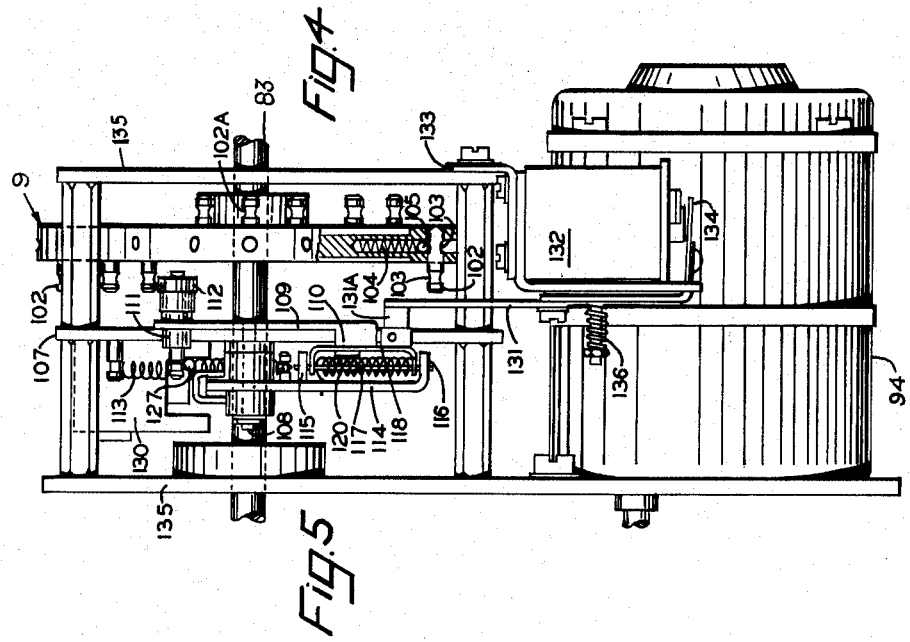
FIGURE 5 is a side elevational view of the portion of the apparatus shown in FIGURE 4, also partly cut away to show constructional details.

The sequencing mechanism 9 includes a selector wheel 101 which is fixedly mounted on the shaft 83 intermediate the switch plate 85 and the clutch 98. Disposed near the periphery of this wheel is a series of uniformly spaced actuator pins 102 which extend in directions parallel to the wheel axis and are adapted to protrude, as desired, on one side of the wheel or the other. As best shown in FIGURE 5, each of the pins 102 is provided with a groove 103 adjacent each end thereof. At each pin location, a radial hole is drilled into the wheel 101 which accommodates a compression spring 104 and a ball 105. The ball 105 is arranged to engage one or the other of the grooves 103 in the corresponding pin, thereby forming a detent combination with the pin to enable the manual positioning thereof, for purposes presently to be made clear. The total number of pins on the wheel 101 corresponds to the number of pairs of the contact elements 86 and 87 (FIGURE 1) and to the number of positions on the print wheel 55.

Suitably supported in spaced, parallel relationship with the selector wheel 101 is a fixed plate 107 (FIGURES 4 and 5) which carries a post 108. This post extends in a direction parallel to that of the shaft 83 and pivotally supports a flat arm 109 intermediate its ends. The arm 109 is disposed on the side of the plate 107 adjacent the wheel 101 and includes an integrally formed projection 110 at its lower end, as viewed in FIGURE 4, which meets the remaining arm portion at a right angle. A pivot post 111 is supported adjacent the opposite, upper end of the arm 109, and this post serves as a bearing for a roller 112 journalled thereon. The arm 109 is urged in a clockwise direction about the post 108 by a tension spring 113 which holds the post 111 against the adjacent edge of the bracket 107. As the shaft 83 and the selector wheel 101 rotate, however, certain of the pins 102 engage the roller 112 to rotate the arm 109 counterclockwise through a small angle, for purposes that will become more fully apparent hereafter.

Also pivoted about the post 108 is a flat arm 114. The arm 114 is disposed on the side of the plate 107 opposite that adjacent the arm 109 and is provided with two integrally formed lugs 115 and 116. These lugs support a shaft member 117 which, in the position illustrated in FIGURE 5, extends in a vertical direction and pivotally supports a latch 118. The main body portion of the latch 118 is substantially flat and extends outwardly from the shaft member 117 in a plane parallel to that of the selector wheel 101. An opening 119 is formed adjacent the outer end of the latch in position to accommodate the projection 110 on the arm 109. The latch is biased toward the arm projection 110 by a torsion spring 120 disposed around the shaft 117, and the portion of the latch adjacent the opening 119 is bent away from the arm projection, as at 121, to provide a camming surface as the projection and the latch approach their latching position, in a manner that will become more fully apparent hereafter.

Horizontally spaced adjacent the lower portion of the latch 118 are two lugs 122 and 123 which are drilled to provide slidable supports for an elongated actuator pin 124. The pin 124 includes a collar 125 which is affixed thereto intermediate the lugs 122 and 123 and serves to limit outward translatory movement of the pin. A light compressible spring 126 is disposed around the pin 124 and engages the collar 125 to urge the pin outwardly toward its fully extended position.

Figure 4:
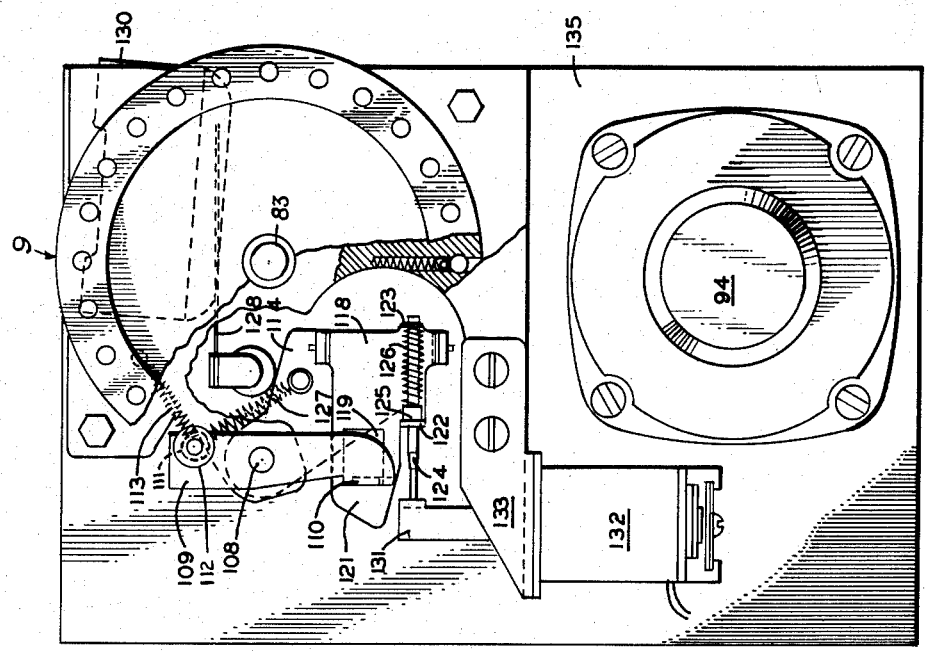
FIGURE 4 is a side elevational view, partially cut away to show constructional details, of a portion of the apparatus, as seen from the left in FIGURE 3.

The flat arm 114 is biased about the pivot post 108 in a counterclockwise direction, as viewed in FIGURE 4, by a coil spring 127. Along an edge of the arm 114, rolling engagement is made with an actuator arm 128 which controls a single-action, snap-switch 130 having a normal position, designated B in FIGURE 2, and an actuated position, designated A. The arrangement is such that, upon disengagement of the latch 118 from the projection 110 of arm 109, the arm 114 pivots rapidly about the post 108 under the action of the spring 127, thereby raising the switch arm 128 and actuating the switch 130. As will become more fully apparent from the discussion which follows, actuation of the switch 130 initiates rotation of the sequencing wheel 101. Upon the engagement of one of the pins 102 with the roller 112 on the arm 109, this arm and its projection 110 pivots in a counterclockwise direction about the post 108 to reengage the latch aperture 119. As the pin disengages the roller 112, the spring 113, acting through the arm 109 and the projection 110, moves the latch 118 and the arm 114 clockwise to enable the switch arm 128 to return to the position shown in FIGURE 4. In this position, the switch 130 is in its normal "off" position.

A solenoid 132 is supported on a bracket 133 carried by the sub-frame 135. This solenoid is provided with an L-shaped armature 134 which is pivoted at the right angle and is constrained by a biasing spring 136 in opposition to the action of the magnetic force. Attached to the armature 134 as an extension thereof is an elongated actuator 131 which terminates in a right-angle projection or tab 131A. This tab is in juxtaposition with the actuator pin 124, already referred to, and, when caused to deflect by the solenoid, makes contact with the pin 124 to thereby turn the latch member 118 about the axis of the vertical shaft 117, thus disengaging the latch member from the projection 110 of arm 109. The arm 114 is thereupon freed for operation by the spring 127 to initiate the sequencing action.

It may be noted here that various alternative means for operating the latch member 118 are possible and within the scope of this invention. For example, in place of the co-acting actuator 131 and actuator pin 124, the latch member may be dislodged by the magnetic attraction of a suitably disposed solenoid (not shown), the materials of the associated parts being readily chosen and formed so that magnetic force will be localized between this solenoid and the latch member.

*Operation*

Prior to the measuring and recording operations, the sequencing mechanism 9 is adjusted to select particular, predetermined pairs of the contact elements 86 and 87 (FIGURE 1) which are connected to the thermocouples for the magnitudes to be measured. To accomplish this adjustment, the actuator pins 102 which correspond with the selected contact elements are located in their left hand positions, as viewed in FIGURE 5, while the remaining, inactive pins are disposed in their right hand positions.

Power of a standard voltage and frequency is applied to the system through the lines 29 and 30 (FIGURE 2), thus operating the drive motor 94 connected across these lines to rotate the gear 97. The shaft 83 remains stationary at this time, however, the magnetic clutch 98 being in its deenergized condition.

To initiate the operation cycle, there is provided a double-deck, three-position switch 170 having decks 156 and 168 and positions A, B and C. The mid-position, B, is the "off" position, while the position A is the "Automatic" position and the position C is for "Manual" operation. (For purposes of clarity, individual power switches for the self-balancing system, the detector-amplifier and other electrical elements have not been shown in the drawings.)

With the switch 170 arranged for automatic operation (as shown), the following sequence of events may be followed: The switch 130, which at this point is in its normal, B position, supplies power from the lead 29 through two conductors 154 and 159 to the winding 35 of the balancing motor 27, thus initiating normal operation of the measuring system 5 in the manner described heretofore. Power also is supplied from a branch conductor 155 connected to the conductor 154, through the switch deck 156 (in position A) and a conductor 157 to the timer motor 78, thereby driving the timing shaft 70. The speed of the motor 78 is pre-selected to provide for timed operation of the transfer switches 73 and 74. In the normal, unoperated position at the transfer switch 74, the line 29 is connected through a rectifier unit 169, a variable resistor 165 and conductors 162 and 164 to a capacitor 166, thus charging this capacitor. As indicated above, the cams 71 and 72 for the transfer switches are displaced angularly from one another on the shaft 70 so that the switches do not transfer at the same time. The switch 74 transfers first and connects the capacitor 166 through a conductor 163 to the print solenoid 68. The capacitor thereupon discharges through the solenoid and provides a sharp, momentary impulse to operate the printing mechanism 6 in the manner described hereinbefore.

Immediately following this printing impulse, the second transfer switch 73 is operated by its cam 71 to supply power from the lead 29, through a conductor 160, the switch deck 168 (in position A) and a conductor 161 to the trip solenoid 132 in the sequencing mechanism, thereby causing this solenoid to be energized momentarily. As best shown in FIGURES 3, 4, and 5, the consequent movement of the actuator tab 131A against the pin 124 trips the latch plate 118 to disengage the arm projection 110 from the aperture 119. The spring-biased arm 114 thereupon moves about the post 108 to operate the switch 130. This last-named switch moves from its normal position B (FIGURE 2) to position A, thus opening the circuit for the timer motor 78 and the balancing motor 27, to arrest operation of the timing mechanism 7 and the measuring system 5.

In its new position (position A), the switch 130 applies A.C. line current to a full-wave rectifier unit 149 whose D.C. output is connected by conductors 152 and 153 to the magnetic clutch 98. Upon energization, the clutch 98 transfers power from the continuously running drive motor 94, through the associated gear train and the drive gear 97 to the shaft 83, thereby rotating this shaft. The shaft 83 drives the print shaft 43 through the bevel gears 81 and 82, thus causing the indexing of the print wheel 55 in the manner hereinbefore set forth. Concurrently, the shaft 83 turns the selector wheel 101 until the next selected actuator pin 102 encounters the roller 112 (FIGURE 4). Further rotation of the wheel 101 moves the roller 112 against the tension in the spring 113 to thereby turn the arm 109 counterclockwise and move the projection 110 at its lower end in the direction of the aperture 119 in the released latch plate 118. This enables reengagement of projection 110 with the aperture 119. At the time the roller 112 passes over the pin 102, the arm 109 returns to its normal position under the force of the spring 113, drawing with it the plate 118 and arm 114. This action returns the switch 130 to its B position (FIGURE 2), thus deenergizing the clutch 98 to arrest the rotation of the shafts 83 and 43 and complete the sequencing cycle.

Upon the arrest of the shaft 83 in response to each selected actuator pin 102, the switching mechanism 8 comes to rest with the conductors 22 and 23 connected to the particular contact elements 86 and 87 corresponding to one of the sources of magnitudes to be measured. The return of the switch 130 to position B initiates operation of the balancing motor 27 and the timer motor 78 in the manner described above to enable the measurement and recording of the selected magnitude. After the elapse of a fixed time interval determined by the speed of the timing shaft 70 and sufficient to permit completion of these functions, the cam 71 on this shaft again operates the transfer switch 73 to energize the trip solenoid 132 and start the next sequencing cycle.

It is apparent that any combination of stations on the selector wheel 101 may be accommodated within the maximum number provided. Likewise, since these stations are synchronized with the positions of the print wheel 55 and the positions of the multipoint switching mechanism 8, any number of measuring points may be accommodated up to the pre-established maximum number. On points of measurement, the timing mechanism 7 allows sufficient time for the performance of the balancing and printing functions. On all other points, the shafts 83 and 43 move at maximum speed to minimize "deadtime" of the apparatus. The program of operation is readily set up in accordance with the connections made to the switching mechanism 8 from the points of measurement. The pins on selector wheel 101 corresponding to these active points are manually pushed to their left-hand positions, as viewed in FIGURE 3, while those corresponding to the inactive points are pushed to their right-hand positions.

The terms and expressions which have been employed are used as terms of description and not of limitation, and there is no intention in the use of such terms and expressions, of excluding any equivalents of the features shown and described, or portions thereof, it being recognized that various modifications are possible within the scope of the invention claimed.

What is claimed is:

1. In a multiple-point measuring instrument, in combination, a plurality of elements at least some of which are respectively associated with sources of magnitudes to be measured, means for mechanically programming preselected ones of said elements corresponding with the magnitudes to be measured, a balanceable measuring network, switching means for successively connecting said network to all of said elements, and means for balancing said network only in correspondence with the magnitudes associated with said selected elements.

2. In a multiple-point measuring instrument, in combination, a plurality of elements at least some of which are respectively associated with sources of magnitudes to be measured, a balanceable measuring network, switching means for connecting said network to said elements, means for operating said switching means, to successively connect said network to each of said elements, programming means for mechanically programming preselected ones of said elements corresponding with the magnitudes to be measured, means controlled by said programming means for arresting operation of said switching means upon the connection thereby of said balanceable network to each of the selected elements, and means for balancing said network only in correspondence with the magnitudes associated with said selected elements.

3. In a multiple-point measuring instrument, in combination, a plurality of elements including active elements respectively associated with sources of magnitudes to be measured and including inactive elements, a balanceable measuring network, switching means for connecting said network to said elements, means for driving said switching means, to successively connect said network to each of said elements, sequencing means in operative relationship with said switching means for mechanically programming only the active elements corresponding with the magnitudes to be measured, means controlled by said sequencing means for arresting operation of said switching means upon the connection thereby of said balanceable network to each of said active elements, and means responsive to the arrest of said switching means for balancing said network in correspondence with the magnitudes associated with the active elements but not in correspondence with the inactive elements, whereby the speed of connection by said switching means from one inactive element to another is greater than from one active element to another.

4. In a multiple-point measuring instrument, in combination, a plurality of elements at least some of which are respectively associated with sources of magnitudes to be measured, programming means for mechanically programming preselected ones of said elements corresponding with the magnitudes to be measured, a balanceable measuring network, switching means for connecting said network to the selected elements, means for driving said switching means, timing means operable at substantially constant speed, means controlled by said timing means for operating said driving means, to thereby drive said switching means, means controlled by said programming means for automatically arresting operation of said driving means, and hence said switching means, upon the connection thereby of said balanceable network to each of the selected elements, and means for balancing said network in correspondence with the magnitudes associated with said selected elements.

5. In a multiple-point measuring instrument, in combination, a plurality of elements at least some of which are respectively associated with sources of magnitudes to be measured, a balanceable measuring network, switching means for successively connecting said network to said elements, sequencing means for mechanically programming preselected ones of said elements corresponding with the magnitudes to be measured, means for driving said switching means, to successively connect said balanceable network to each of said elements, a switch for controlling operation of said driving means, timing means operable at substantially constant speed, means controlled by said timing means for actuating said switch to operate said driving means, to thereby drive said switching means, means controlled by said sequencing means for actuating said switch to arrest operation of said driving means, and hence said switching means, upon the connection thereby of said balanceable network to each of the selected elements and means responsive to the arrest of said switching means for balancing said network only in correspondence with the magnitudes associated with the selected elements.

6. In a multiple-point measuring instrument, in combination, a plurality of elements at least some of which are respectively associated with sources of magnitudes to be measured, a balanceable measuring network, switching means for successively connecting said network to all of said elements, programming means in operative relationship with said switching means for mechanically programming only ones of said elements corresponding with the magnitudes to be measured, means including an electro-magnetic clutch for driving said switching means and said programming means, a switch for controlling operation of said clutch, timing means operable at substantially constant speed, means controlled by said timing means for actuating said switch to energize said clutch, to thereby initiate operation of said programming means and said switching means, means controlled by said programming means for actuating said switch to deenergize said clutch, to thereby automatically arrest operation of said driving means, and hence said programming means and said switching means, upon the connection of said balanceable network to each of the selected elements, and means responsive to the arrest of said programming means and said switching means for balancing said network in correspondence with the the magnitude associated with the selected element connected thereto.

7. In a multiple-point measuring instrument, in combination, a plurality of elements including active elements respectively associated with sources of magnitude to be measured and including inactive elements, a balanceable measuring network, switching means for successively connecting said network to each of said elements, programming means in operative relationship with said switching means for mechanically programming only the active elements corresponding with the magnitudes to be measured, means for driving said switching means and said programming means, a switch for controlling operation of said driving means, timing means operable at substantially constant speed, means controlled by said timing means for actuating said switch to operate said driving means, to thereby drive said programming means and said switching means, means controlled by said programming means for actuating said switch to arrest operation of said driving means, and hence said programming and said switching means, upon the connection of said balanceable network to each of said active elements, and means responsive to the arrest of said programming means and said switching means for balancing said network in correspondence with the magnitudes associated with the active elements but not in correspondence with the inactive elements, whereby the speed of connection by said switching means from one inactive element to another is greater than from one active element to another.

8. An instrument of the character set forth in claim 7, in which said timing means initiates operation of said switching means a fixed time interval after each arrest thereof in response to said programming means.

9. A multiple-point measuring and recording instrument, comprising, in combination, a plurality of elements at least some of which are respectively associated with sources of magnitudes to be measured, a balanceable measuring network, switching means for selectively connecting said network to said elements, sequencing means in operative relationship with said switching means for mechanically programming preselected ones of said elements corresponding with the magnitudes to be measured, means for recording the magnitudes associated with the selected elements on a common record medium, means for controlling the operation of said switching means, to connect said balanceable network to the selected elements, means for balancing said network only in correspondence with the magnitudes associated with said selected elements, and means for actuating said recording means, to record said magnitudes on said medium.

10. A multiple-point measuring and recording instrument, comprising, in combination, a plurality of elements at least some of which are respectively associated with sources of magnitudes to be measured, a balanceable measuring network, switching means for successively connecting said network to all of said elements, sequencing means in operative relationship with said switching means for mechanically programming preselected ones of said elements corresponding with the magnitudes to be measured, means for controlling the operation of said switching means and said sequencing means, to connect said balanceable network to said elements, means for balancing said network only in correspondence with the magnitudes associated with said selected elements, and means for recording said magnitudes on a common record medium.

11. A multiple-point measuring and recording instrument, comprising, in combination, a plurality of elements at least some of which are respectively associated with sources of magnitudes to be measured, a balanceable measuring network, switching means for connecting said network to said elements, means for driving said switching means, to successively connect said network to each of said elements, sequencing means in operative relationship with said switching means for mechanically programming preselected ones of said elements corresponding with the magnitudes to be measured, means for recording the magnitudes associated with the selected elements on a common record medium, said recording means including indicia means individual to each of said elements, means for simultaneously controlling the operation of said indicia means and said switching means, to select the particular indicia corresponding to each selected element, means for balancing said nework only in correspondence with the magnitude associated with said selected element, and means for actuating said recording means, to record said magnitude on said medium.

12. A multiple-point measuring and recording instrument, comprising, in combination, a plurality of elements at least some of which are respectively associated with sources of magnitudes to be measured, a balanceable measuring network, switching means for connecting said network to all of said elements, programming means in operative relationship with said switching means for mechanically programming preselected ones of said elements corresponding with the magnitudes to be measured, means controlled by said balanceable network for recording the magnitudes associated with the selected elements on a common record medium, said recording means including indicia means individual to each of said elements, operating means for simultaneously driving said switching means, said programming means and said indicia means, means controlled by said programming means for automatically arresting said operating means, and hence said switching means, said programming means and said indicia means, upon the connection of said balanceable network to each of the selected elements, means for balancing said network only in correspondence with the magnitudes associated with said selected elements, and means for actuating said recording means, to record said magnitudes on said medium.

13. An instrument of the character set forth in claim 12, in which said operating means includes a continuously rotating motor, a shaft in driving relationship with said switching means, said programming means and said indicia means, and an electrically operated clutch for connecting said motor with said shaft.

14. An instrument of the character set forth in claim 13, comprising timing means for initiating operation of said clutch to connect said motor with said shaft and thereby drive said switching means, said programming means and said indicia means, said programming means initiating operation of said clutch to disconnect said motor from said shaft and arrest said switching means, said programming means and said indicia means.

15. A multiple-point measuring instrument, comprising, in combination, a plurality of elements at least some of which are respectively associated with sources of magnitudes to be measured, a balanceable measuring network, switching means for successively connecting said network to each of said elements, programming means in operative relationship with said switching means for enabling the selection, from the maximum number of elements provided, of particular ones of said elements corresponding with the magnitudes to be measured, means controlled by said balanceable network for recording the magnitudes associated with the selected elements on a common record medium, means for driving said switching means and said programming means, a switch for controlling operation of said driving means, means for actuating said switch to operate said driving means, to thereby drive said programming means and said switching means, means controlled by said programming means for actuating said switch to arrest operation of said driving means, and hence said programming means and said switching means, upon the connection of said balanceable network to each of said selected elements, means for balancing said network only in correspondence with the magnitudes associated with said selected elements, and means for actuating said recording means to record said magnitudes on said record medium.

16. A multiple-point measuring instrument comprising, in combination, a plurality of elements at least some of which are respectively associated with sources of magnitudes to be measured, a balanceable measuring network, switching means for successively connecting said network to each of said elements, sequencing means for enabling the programming, from the maximum number of elements provided, of particular ones of said elements corresponding with the magnitudes to be measured, means controlled by said balanceable network for recording the magnitudes associated with the selected elements on a common record medium, said recording means including indicia means individual to each of said elements, means for driving said switching means, said indicia means and said sequencing means, timing means in operative relationship with said recording means, means controlled by said timing means for operating said driving means, to thereby drive said switching means, said indicia means and said sequencing means, means controlled by said sequencing means for arresting operation of said driving means, and hence said switching means, said indicia means and said sequencing means, upon the connection of said balanceable network to each of said selected elements and means responsive to the arrest of said driving means for balancing said network only in correspondence with the magnitudes associated with said selected elements, said timing means thereafter actuating said recording means to record said magnitudes on said record medium.

17. A multiple-point measuring instrument, comprising, in combination, a plurality of elements including active elements respectively associated with sources of magnitudes to be measured and inactive elements, a balanceable measuring network, switching means for successively connecting said network to each of said elements, sequencing means for enabling the selection, from the maximum number of elements provided, of the active elements corresponding with the magnitudes to be measured, means controlled by said balanceable network for recording the magnitudes associated with the active elements on a common record medium, said recording means including indicia means individual to each of said elements, means for driving said switching means, said indicia means and said sequencing means, a switch for controlling operation of said driving means, timing means in operative relationship with said recording means, means controlled by said timing means for actuating said switch to operate said driving means, to thereby drive said switching means, said indicia means and said sequencing means, means controlled by said sequencing means for actuating said switch to arrest operation of said driving means, and hence said switching means, said indicia means and said sequencing means, upon the connection of said balanceable network to each of said active elements, and means responsive to the arrest of said driving means for balancing said network in correspondence with the magnitudes associated with said active elements but not in correspondence with the inactive elements, whereby the speed of connection by said switching means from one inactive element to another is greater than from one active element to another, said timing means actuating said recording means upon the balancing of said network to record said magnitudes on said record medium.

18. A multiple-point measuring instrument, comprising, in combination, a plurality of elements including active elements respectively associated with sources of magnitudes to be measured and inactive elements, a balanceable measuring network, switching means for successively connecting said network to each of said elements, programming means operatively connected with said switching means for enabling the preselection, from the maximum number of elements provided, of the active elements corresponding with the magnitudes to be measured, means controlled by said balanceable network for recording the magnitudes associated with the active elements on a common record medium, said recording means including indicia means individual to each of said elements, means including an electromagnetic clutch for driving said switching means, said indicia means and said programming means, a switch for controlling operation of said clutch, timing means in operative relationship with said recording means, means controlled by said timing means for actuating said switch to energize said clutch, to thereby initiate operation of said switching means, said indicia means and said programming means, means controlled by said programming means for actuating said switch to deenergize said clutch, to thereby arrest operation of said driving means, and hence said switching means, said indicia means and said programming means, upon the connection of said balanceable network to each of said active elements, and means responsive to the arrest of said driving means for balancing said network in correspondence with the magnitudes associated with said active elements but not in correspondence with the inactive elements, whereby the speed of connection by said switching means from one inactive element to another is greater than from one active element to another, said timing means actuating said recording means upon the balancing of said network to record said magnitudes on said record medium.

References Cited by the Examiner

UNITED STATES PATENTS

| | | | |
|---|---|---|---|
| 2,207,343 | 7/40 | Fairchild | 346—32 |
| 2,392,916 | 1/46 | Gruss | 346—32 |
| 2,421,834 | 6/47 | Crowther | 346—17 |
| 2,423,480 | 7/47 | Caldwell | 346—32 |
| 2,549,401 | 4/51 | Stein et al. | 346—33 |
| 2,579,831 | 12/51 | Keinath | 346—33 |
| 2,628,149 | 2/53 | Blakeslee | 346—32 |
| 2,912,163 | 11/59 | Van Tuyl | 235—183 |
| 3,034,125 | 5/62 | Gonzenbach | 346—79 |

LEYLAND M. MARTIN, *Primary Examiner.*
EMIL G. ANDERSON, *Examiner.*